United States Patent [19]
Tamer et al.

[11] Patent Number: 5,619,501
[45] Date of Patent: Apr. 8, 1997

[54] CONDITIONAL ACCESS FILTER AS FOR A PACKET VIDEO SIGNAL INVERSE TRANSPORT SYSTEM

[75] Inventors: Gregory G. Tamer, Indianapolis; Michael S. Deiss, Zionsville; John W. Chaney; James E. Hailey, both of Indianapolis, all of Ind.

[73] Assignee: Thomson Consumer Electronics, Inc., Indianapolis, Ind.

[21] Appl. No.: 232,794

[22] Filed: Apr. 22, 1994

[51] Int. Cl.$^6$ ..................... H04J 3/26
[52] U.S. Cl. ..................... 370/392
[58] Field of Search ............ 370/99, 94.1, 110.1; 380/16, 50; 348/5.5, 6, 7, 8, 9, 10, 461, 462, 463, 465, 466, 467, 469, 473

[56] References Cited

U.S. PATENT DOCUMENTS

| | | | |
|---|---|---|---|
| 4,829,589 | 5/1989 | Uekusa | 380/50 |
| 4,833,710 | 5/1989 | Hirashima | 380/16 |
| 4,862,501 | 8/1989 | Kamitake et al. | 380/50 |
| 5,168,356 | 12/1992 | Acampora et al. | 358/133 |
| 5,208,856 | 4/1993 | Leduc et al. | 380/16 |
| 5,233,654 | 8/1993 | Harvey et al. | 380/20 |
| 5,289,276 | 2/1994 | Siracusa et al. | 348/467 |
| 5,406,626 | 4/1995 | Ryan | 380/50 |
| 5,414,694 | 5/1995 | Crayford et al. | 380/50 |

FOREIGN PATENT DOCUMENTS

| | | | |
|---|---|---|---|
| 0256596A2 | 2/1988 | European Pat. Off. | H04N 7/167 |
| 0582122A1 | 2/1994 | European Pat. Off. | H04N 7/167 |
| WO85/00718 | 2/1985 | WIPO | H04N 7/16 |
| WO88/01463 | 2/1988 | WIPO | H04N 7/04 |
| WO94/14284 | 6/1994 | WIPO | H04N 7/16 |

OTHER PUBLICATIONS

The Satellite Book, a Complete Guide to Satellite TV Theory and Practice, Swift Television Publications, 17 Pittsfield, Criclade, Wilts, England, 1994 secs, 25–26.
"Conditional Access Broadcasting: Datacare 2", By D. T. Wright, BBC Research Department Report No. 10, Aug. 1988, pp. 1–18, Tadworth, Surrey, Gr. Britain.
PCT International Search Report, Jul. 18, 1995.
European Search Reports (2), Jan. 12, 1989 and Nov. 26, 1993.
Grand Alliance HDTV System Specification, by National Association of Broadcasters (NAB) Office of Science and Technology, 1994 Proceedings of 48th Annual Conference, Chapter 5, Section 5.7, pp. 5.P.46–51, Apr. 14, 1994.

Primary Examiner—Wellington Chin
Assistant Examiner—Huy D. Vu
Attorney, Agent, or Firm—Joseph S. Tripoli; Eric P. Herrmann; Ronald H. Kurdyla

[57] ABSTRACT

Apparatus in a receiver, for processing transmitted entitlement control information, includes a packet transport processor for selecting signal packets having payloads containing a conditional access payload header and a remaining payload of entitlement data. Respective payload headers include groups of bytes which are coded in a manner to allow or disallow the respective receiver from processing the entitlement data. A conditional access filter preprogrammed with a subscriber specific conditional access codeword examines respective byte groupings of the conditional access header for a match with the subscriber specific conditional access codeword. Only if a match occurs is the processor permitted to process the entitlement data. The entitlement data is thereafter utilized to generate decryption keys for descrambling portions of the transmitted signal.

12 Claims, 7 Drawing Sheets

CONDITIONAL ACCESS FILTER AS FOR A PACKET VIDEO SIGNAL INVERSE TRANSPORT SYSTEM

This invention relates to apparatus for processing packets of program component data from a packet video signal and more particularly to circuitry for detecting packet payloads to which a subscriber has conditional access for entitlement information.

BACKGROUND OF THE INVENTION

It is known from, for example, U.S. Pat. No. 5,168,356 and U.S. Pat. No. 5,289,276, that it is advantageous to transmit compressed video signal in packets, with respective packets affording a measure of error protection correction. The systems in the foregoing patents transmit and process a single television program, albeit with a plurality of program components, from respective transmission channels. These systems utilize inverse transport processors to extract the video signal component of respective programs for further processing to condition the video component for reproduction.

It is known, from for example, THE SATELLITE BOOK A COMPLETE GUIDE TO SATELLITE TV THEORY AND PRACTICE, Swift Television Publications, 17 Pittsfield, Cricklade, Wilts, England, that transmitted television signal reception can be limited to particular subscribers by scrambling the signal. The limitations may be altered at the will of the broadcaster by periodically transmitting different entitlement data. The entitlement data is processed by smart cards located in respective receivers to generate deception or descrambling keys, for use by decryption or descrambling devices in only those receivers entitled to reproduce the associated program material. In a packet video system of the aforementioned type, entitlement data may be included in specific packets which are recognizable as containing such data for easy access by smart card circuitry.

A large area broadcast system, such as a direct broadcast satellite system targeted for North America, will have very large numbers of subscribers. This number will be so large as to preclude changing the entitlement data of specific receivers on very short notice. Consider, for example, that a broadcaster is required to black out the area local to a sports stadium in the event that tickets for the sporting event are not sold out. This information may not be available until immediately before the event. The broadcaster of course will want to wait until the last possible minute before making the decision to black out the local region. The present invention provides a method and apparatus whereby entitlement data is layered to provide denial of entitlements to receive program material on short notice.

SUMMARY OF THE INVENTION

The present invention is a system/method for layered entitlement data transmission/reception. A receiver embodiment includes a packet transport processor for selecting packets having payloads containing a conditional access payload header and a remaining payload of entitlement data. Respective payload headers include groups of bytes which are coded in a manner to allow or disallow the respective receiver from processing the entitlement data. A conditional access filter preprogrammed with a subscriber specific conditional access codeword examines respective byte groupings of the conditional access header for a match with the subscriber specific conditional access codeword. Only if a match occurs is the processor permitted to process the entitlement data.

BRIEF DESCRIPTION OF THE DRAWINGS

The invention will be described with reference to the drawings, wherein.

DETAILED DESCRIPTION

Figure 1:
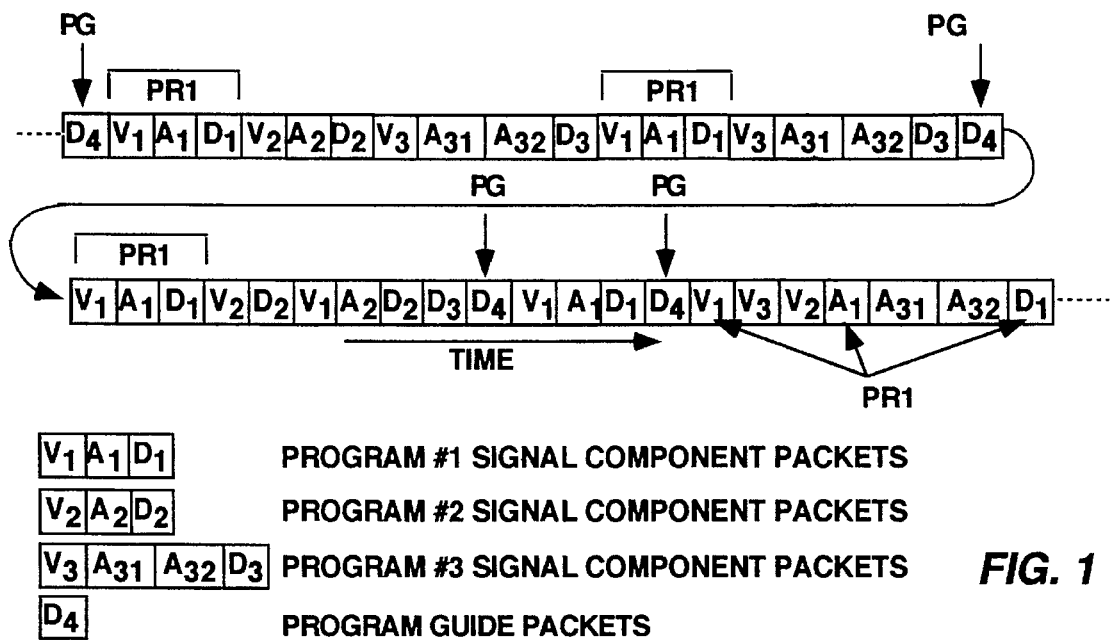
FIG. 1 is a pictorial representation of a time division multiplexed packet television signal.

FIG. 1 shows a packet signal stream consisting of a string of boxes which represent signal packets that contain components of a plurality of different television or interactive television programs. These program components are assumed to be formed of compressed data and as such the quantity of video data for respective images is variable. The packets are of fixed length. Packets with letters having like subscripts represent components of a single program. For example, $V_i$, $A_i$, $D_i$ represent video, audio and data packets and packets designated $V_1$, $A_1$, $D_1$, represent video, audio and data components for program 1, and $V_3$, $A_{31}$, $A_{32}$, $D_3$, represent video, audio 1, audio 2 and data components of program 3. The data packets $D_i$ may contain e.g. control data to initiate certain action within a receiver, or they may include executable code forming an application to be executed by e.g., a microprocessor located within or associated with a receiver.

In the upper line of the string of packets the respective components of a particular program are shown grouped together. However there is no necessity of packets from the same program being grouped as is indicated by the entire string of packets. Nor is there any particular order for the sequence of occurrence of respective components.

Figure 2:
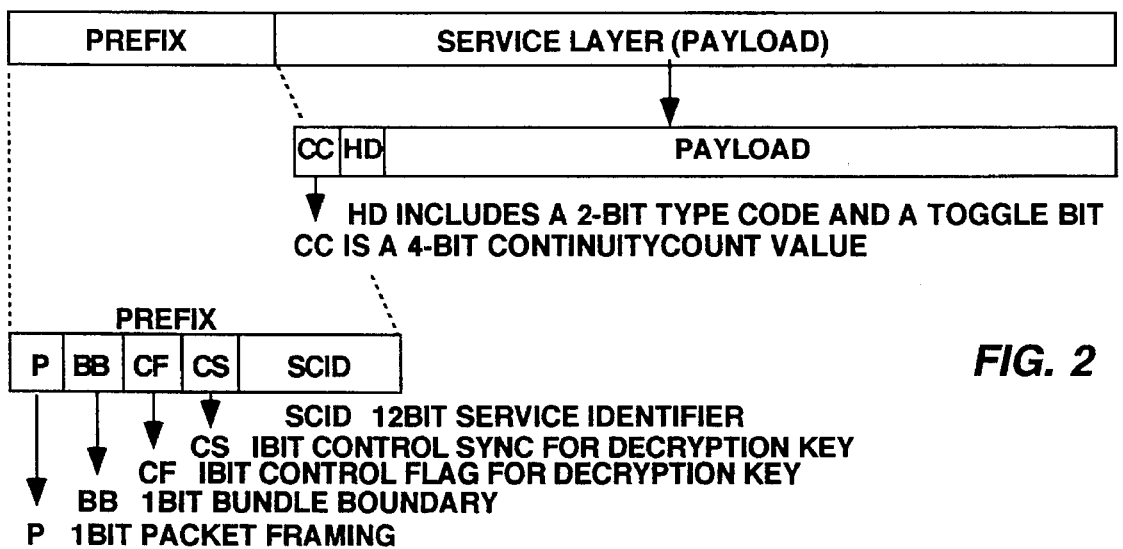
FIG. 2 is a pictorial representation of respective signal packets.

The respective packets are arranged to include a prefix and a payload as shown in FIG. 2. The prefix of this example includes two 8-bit bytes comprising five fields, four (P, BB, CF, CS) of which are 1-bit fields, and one (SCID) of which is a 12-bit field. The SCID field is the signal component identifier. The field CF contains a flag to indicate whether the payload of the packet is scrambled, and the field CS contains a flag which indicates which of two alternative unscrambling keys is to be utilized to unscramble scrambled packets. The prefix of every packet is packet aligned, thus the location of the respective fields are easily identifiable.

Within every payload is a header which contains a continuity count, CC, modulo 16, and a TOGGLE flag bit which are program component specific. The continuity count is simply a successive numbering of sequential packets of the same program component. The TOGGLE flag bit is a one bit signal which changes logic level or toggles on the occurrence of a picture layer start code in an MPEG compressed video component.

Figure 3:
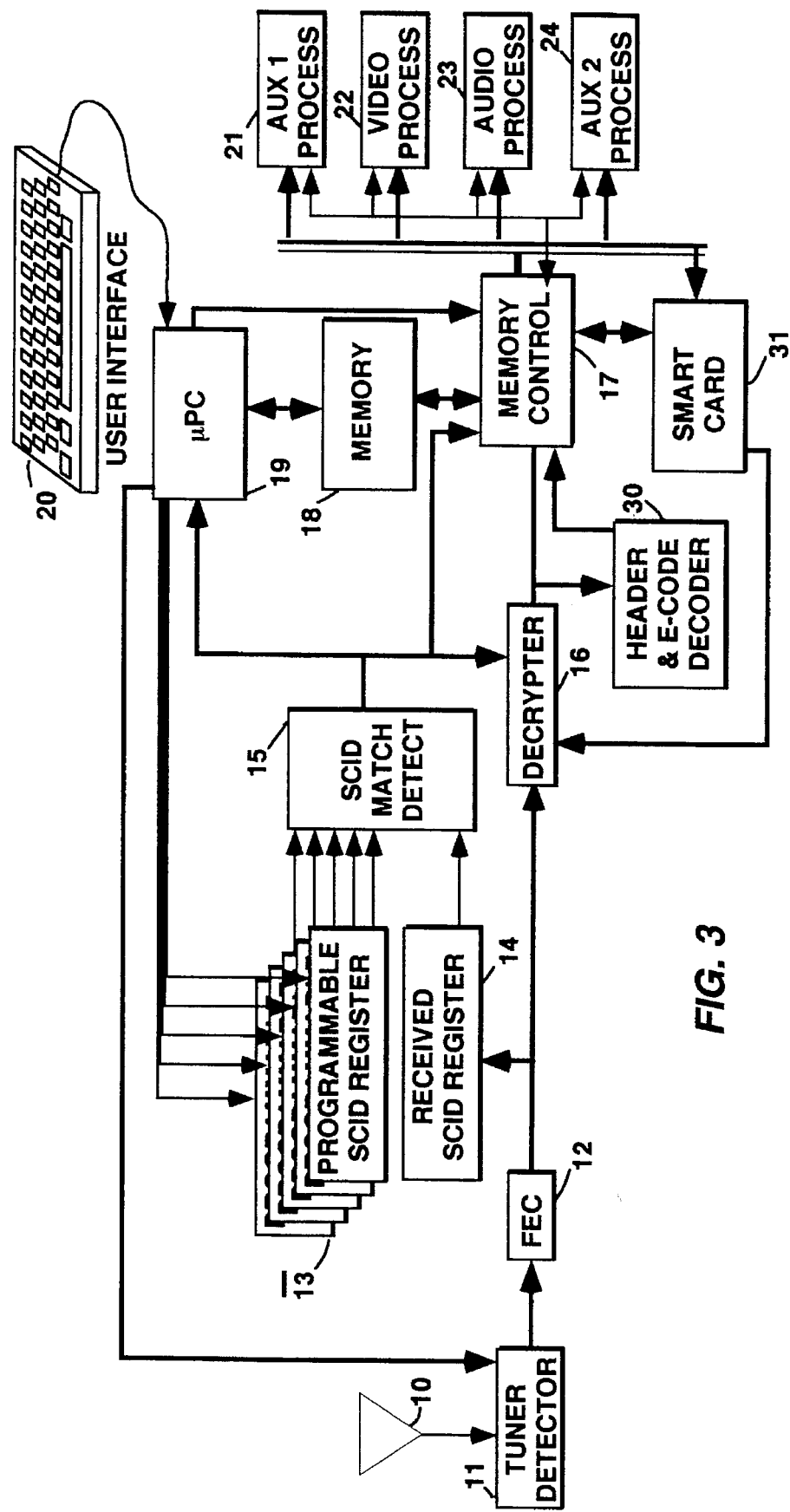
FIG. 3 is a block diagram of a receiver for selecting and processing packets of multiplexed component signals embodying the present invention.

FIG. 3 illustrates in block form, a portion of a digital television signal receiver including elements of an inverse transport processor. Signal is detected by an antenna 10 and applied to a tuner detector, 11, which extracts a particular frequency band of received signals, and provides baseband compressed signal in a binary format. The frequency band is selected by the user through a microprocessor 19 by conventional methods. Nominally broadcast digital signals will have been error encoded using, for example, Reed-Solomon forward error correcting (FEC) coding. The baseband signals will thus be applied to a FEC decoder, 12. The FEC decoder 12 synchronizes the received video and provides an error corrected stream of signal packets of the type illustrated in FIG. 1. The FEC 12 may provide packets at regular intervals, or on demand, by for example, memory controller 17. In either case a packet framing or synchronizing signal is provided by the FEC circuit, which indicates the times that respective packet information is transferred from the FEC 12.

The detected frequency band may contain a plurality of time division multiplexed programs in packet form. To be useful, only packets from a single program should be passed to the further circuit elements. In this example it is assumed that the user has no knowledge of which packets to select. This information is contained in a program guide, which in itself is a program consisting of data which interrelates program signal components through SCID's, and may include information relating to, for example, subscriber entitlements. The program guide is a listing for each program, of the SCID's for the audio, video, data etc. components of respective programs. The program guide (packets D4 in FIG. 1) is assigned a fixed SCID. When power is applied to the receiver, the microprocessor 19 is programmed to load the SCID associated with the program guide into one of a bank of similar programmable SCID registers 13. The SCID fields of the prefix portion of respective detected packets of signal from the FEC 12 are successively loaded in a further SCID register 14. The programmable registers and the received SCID register are coupled to respective input ports of a comparator circuit 15, and the received SCID is compared with the program guide SCID. If the SCID for a packet matches the program guide SCID, the comparator 15 conditions a memory controller 17 to route that packet to a predetermined location in the memory 18 for use by the microprocessor. If the received SCID does not match the program guide SCID, the corresponding packet is simply dumped.

The microprocessor waits for a programming command from the user via an interface 20, which is shown as a computer keyboard, but which may be a conventional remote control, or receiver front panel switches. The user may request to view a program provided on channel 4 (in the vernacular of analog TV systems). The microprocessor 19 is programmed to scan the program guide list that was loaded in the memory 18 for the respective SCID's of the channel 4 program components, and to lead these SCID's in respective other ones of the programmable registers of the bank of registers 13 which are associated with corresponding component signal processing paths.

Received packets of audio, video or data program components, for a desired program, must ultimately be routed to the respective audio 23, video 22, or auxiliary data 21, (24) signal processors respectively. The data is received at a relatively constant rate, but the signal processors nominally require input data in bursts (according to the respective types of decompression for example). The exemplary system of FIG. 3, first routes the respective packets to predetermined memory locations in the common memory 18. Thereafter the respective processors 21–24 request the component packets from the memory 18. Routing the components through the common memory provides a measure of desired signal data rate buffering or throttling.

The audio, video and data packets are loaded into respective predetermined memory locations to enable the signal processors convenient buffered access to the component data. In order that the payloads of respective component packets are loaded in the appropriate memory areas, the respective SCID comparators are associated with those memory areas. This association may be hardwired in the memory controller 17, or the association may be programmable. If the former, specific ones of the programmable registers 13 will always be assigned the audio, video and data SCID's respectively. If the latter, the audio, video and data SCID's may be loaded in any of the programmable registers 13, and the appropriate association will be programmed in the memory controller 17 when the respective SCID's are loaded in the programmable registers.

In the steady state, after the program SCID's have been stored in the programmable registers 13, the SCID's of received signal packets are compared with all of the SCID's in the programmable SCID registers. If a match is made with either a stored audio, video or data SCID, the corresponding packet payload will be stored in the audio, video or data memory area or block respectively.

The respective signal packets are coupled from the FEC 12 to the memory controller 17 via a signal decryptor 16. Only the signal payloads are scrambled and the packet headers are passed by the decryptor unaltered. Whether or not a packed is to be descrambled is determined by the CF flag in the packet prefix, and how it is to be descrambled (one of two alternative descrambling keys) is determined by the CS flag. If no SCID match is had for a respective packet, the decryptor may simply be disabled from passing any data.

The decryptor is programmed with decryption keys provided by the smart card apparatus 31. The smart card is responsive to entitlement information contained in particular packets of the program guide to generate appropriate decryption keys. The system of the present example incorporates two levels of encryption or program access, entitlement control messages, ECM's, and entitlement management messages, EMM's. Program entitlement control and management information is regularly transmitted in packets identifiable with specific SCID's included in the packet stream comprising the program guide. The ECM information contained in these packets is used by the smart card to generate the decryption keys used by the decryptor. The EMM information included in these packets is used by the subscriber specific smart card to determine program material to which the subscriber is entitled. EMM entitlement information within these packets may be made geographically specific, or group specific or subscriber specific. For example, the present system will include a modem (not shown) for communicating billing information from the smart card to the program provider, e.g., the satellite broadcaster. The smart card may be programmed with, for example, the area code and telephone exchange of the receiver location. The EMM may include data, which when processed by the smart card, will entitle or deny reception of particular programs in particular area codes.

The program provider may want the ability to entitle certain subscribers with very short lead time, as for example for pay-per-view programs. The identification of particular subscribers may not be available until shortly before airing of the particular program. With such short lead time it may not be possible to program EMM's on a subscriber basis. A further layer of coding may be instantly impressed on the entitlement information by including a conditional access code to permit/prohibit reception of the EMM and ECM data within respective packets, and thereby allow substantially instant permission/prohibition to certain programs.

Packet payloads containing the EMM and ECM entitlement data include a payload header of 128 bits arranged in specially coded 4 groups of 32 bits. Each of the groups is coded with a conditional access code and each conditional access code may be coded differently. Each subscriber is assigned a specific conditional access code. A matched filter or E-code decoder 30, is arranged to detect a subscriber specific bit pattern within the 128 bit header. If a match is detected the decoder communicates with the memory controller 17 and the smart card 31 to make the remainder of the entitlement payload available to the smart card (via the memory 18). If a match is not detected, the payload is not accepted by the specific receiver. The conditional access codes may be periodically changed if the matched filter 30 is made programmable. These codes may be periodically provided by the smart card. For more specific details on smart card operation as related to viewer entitlements the reader is invited to review Section 25 of THE SATELLITE BOOK, A COMPLETE GUIDE TO SATELLITE TV THEORY AND PRACTICE.

The matched filter or E-code decoder is arranged to perform a second function, which is to detect particular MPEG video headers. These headers are 32-bit start codes, (which is the reason the headers of entitlement payloads are coded in 32-bit groups). If video data is lost, an MPEG video decoder can only restart decompressing video data at particular data entry points. These entry points coincide with MPEG start codes. The decoder may be arranged to communicate with the memory controller 17 to inhibit the flow of video data to memory after video packet losses, and to resume writing video payloads to memory only after the next MPEG start code is detected by the decoder 30.

Figure 4:
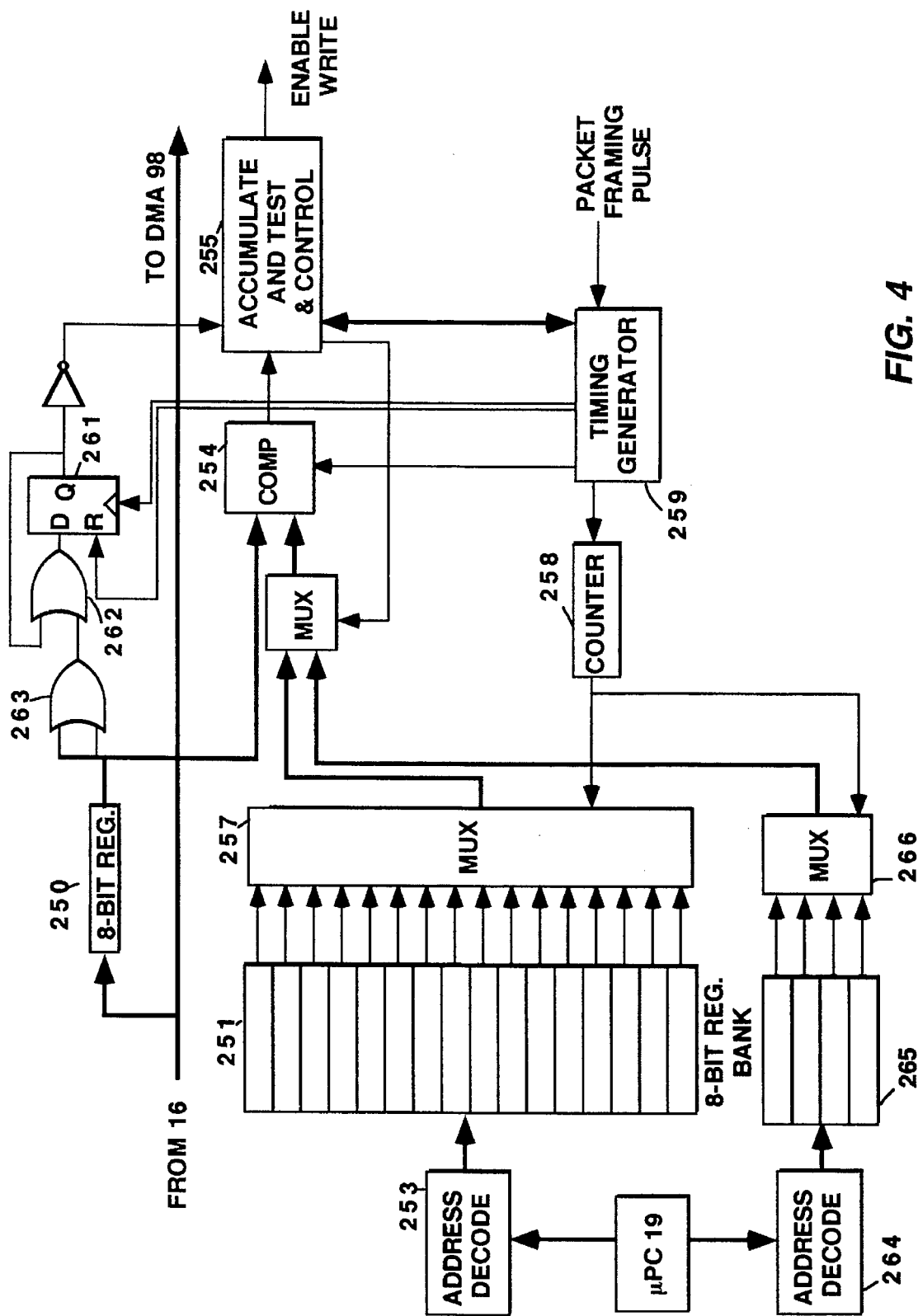
FIG. 4 is a block diagram of a conditional access filter/start code detector.

FIG. 4 illustrates exemplary apparatus for detecting packets which include conditional access information or MPEG start codes (decoder 30 of FIG. 3). Whether the decoder 30 is conditioned to detect entitlement payloads or MPEG start codes is a function of the SCID currently being received. In FIG. 4, it is assumed that data provided from the decryptor 16 is in 8-bit bytes and packet aligned. That is, the first byte of an entitlement payload or the first byte of an MPEG start code is aligned precisely with a particular byte position, e.g., the beginning of a packet payload, such that for detecting specific header or start codewords, their position in the bit/byte stream is precisely known. Data from the decryptor 16 is applied to an 8-bit register 250, which has an 8-bit parallel output port coupled to respective first input connections of a comparator 254 which may be configured of, for example, a bank of eight two-input exclusive NOR (XNOR) circuits having respective output connections coupled to an AND gate and a latch. The latch may be a data latch arranged to latch the results of the AND gate at each byte interval.

A 32-bit MPEG start code is stored as four bytes in an 8-bit register bank 265. Conditional access codes are stored as 8-bit bytes in a bank of 16 8-bit registers 257. Loading of the register banks 251 and 265 is controlled by the microprocessor 19 and/or by the smart card. The start code registers 265 are coupled to a four to one multiplexer 266, and the conditional access code registers are coupled to a sixteen to one multiplexer 257. Output ports of the multiplexers 257 and 266 are coupled to a two to one multiplexer 249. Respective output connections of the multiplexer 249 are coupled to respective corresponding second input terminals of the comparator 254. (Note the input and output connections of the multiplexers 249, 257 and 266 are 8-bit busses.) If the respective values exhibited at the respective output connections of the register 250 are correspondingly the same as the output values exhibited by the respective output connections of the multiplexer 249, a true signal is generated by the comparator 254 circuit for the corresponding data byte.

For start code detection, the multiplexer 266 is scanned by the counter 258 to sequentially couple the four different registers 265 to the comparator in synchronism with the occurrence of the first four payload data bytes from the decryptor 16. Alternatively, for conditional access code detection, the multiplexer 257 is scanned by the counter 258 to sequentially couple different ones of the registers 265 to the comparator circuit 254.

The output of the comparator circuit is applied to an accumulate and test circuit 255. The circuit 255 determines if any of a predetermined number of byte matching conditions have occurred, and if they have, it generates a write enable signal for the entitlement data in the remaining portion of the particular payload under examination. In the present system the entitlement payload header contains 128 bits arranged in four 32-bit conditional access codes. The conditional access filters 30 of different subscribers will be arranged to look for different combinations of bytes of the 128 bits. For example one subscriber apparatus may be arranged to match the first four bytes of the conditional access codes. Another subscriber apparatus may be arranged to match the second four bytes of the conditional access codes and so forth. In either of these exemplary situations the circuitry 255 will determine if a match has occurred for the appropriate four consecutive bytes.

The use of 16 registers in the bank for a subscriber specific conditional access codes somewhat simplifies the circuit structure. Since each subscriber has a four byte conditional access code, the code may be loaded four times in the set of 16 registers. At the transmitter, the broadcaster need not then be concerned about the relative location, with respect to the four groups of four bytes, of the conditional access codes being transmitted. An alternative arrangement may incorporate only a single group of four registers to hold the subscriber specific conditional access code, and these registers may be repeatedly scanned, modulo four, through the 128 bits of the entitlement payload header.

It is not practical to transmit each of the $2^{32}$ possible entitlement codes for every function, as this would undesirably limit the system bandwidth for other services and would also simply take too much time. This limitation may be somewhat alleviated by arranging the conditional access code according to some logical groupings, wherein the groupings are defined by three bytes of respective four byte conditional access codes. In this manner all subscribers in a group may be addressed by conditioning respective receivers of the group to ignore one byte of the four byte conditional access code. In this instance each four byte access code will represent 256 subscribers. The filter conditioning is effected by sending for example all zeroes in the first four byte positions and arranging the conditional access filter to detect this condition. If the condition is satisfied, the conditional access filter is electrically restructured to detect a match of only three bytes of respective groups of four bytes.

A third variant is provided to permit all subscribers conditional access. This is effected by coding the entitlement payload header with all zeroes (or all ones). The conditional access filter is therefore arranged to also include an all zero detector (elements 261–263).

The bits of respective arriving bytes of data are coupled to respective terminals of the 8-bit OR gate 263. If any one of the bits is a logic one the OR gate 263 generates a logic one output. The output of the OR gate 263 is coupled to one input of a two-input OR gate 262, which has an output and second input coupled respectively to the data-input and Q-output terminals of a D-type latch 261. The D-type latch is clocked by the timing circuit 259 synchronously with the arrival of incoming data bytes. If any bit in any of the data bytes which occurs after the latch is reset is a logic one, the latch 261 will exhibit a logic one at its Q-output until the next reset pulse. The Q-output of latch 261 is coupled to an inverter which exhibits a zero output level whenever the latch exhibits a one output level. Thus, if after the 128 bits (16 bytes) of the header have been passed through register 250, the output of the inverter is high, then the 128 bits are zero valued. The latch is reset prior to the reception of each new payload. Responsive to detection of a high output level from the inverter after passage of the entitlement payload header, the circuitry 255 will generate a data write enable signal.

Figure 5:
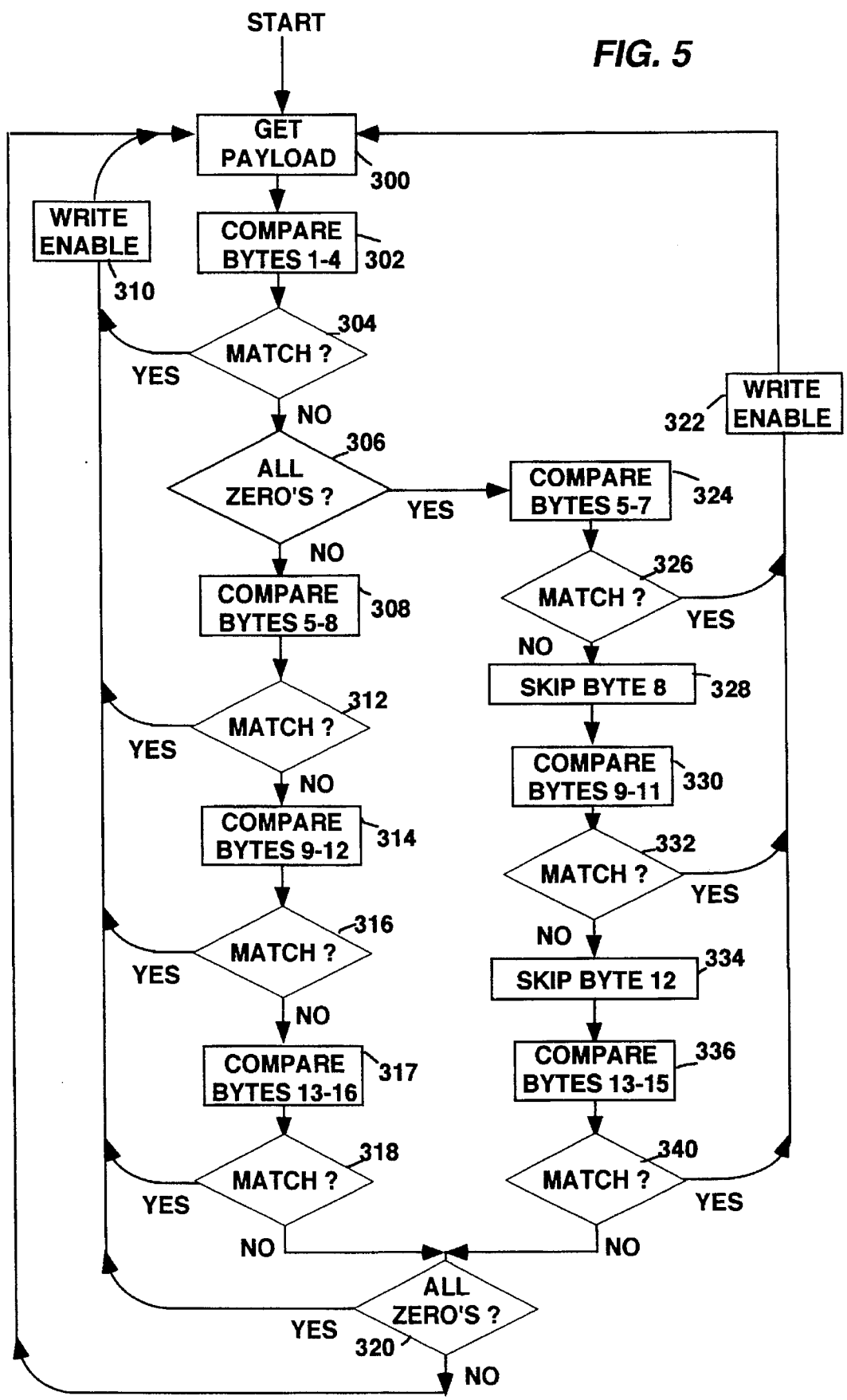
FIG. 5 is a flow chart of the conditional access filter operation.

FIG. 5 is a flow chart of the operation of the conditional access filter 30. The process is started by the detection of the associated SCID. Once the appropriate SCID has been detected the payload is applied {300} to the filter 30. A comparison {302} is made of the first four bytes of the header with the subscriber specific conditional access code. If a match occurs, an entitlement data write enable is generated {310}. If not the first four bytes are examined {306} for all zeroes. If all zeroes are not detected, the second four bytes of the header are compared {308} with the subscriber specific conditional access code. If they match {312}, a write enable is generated {310}. If not the third set of four bytes is compared {314} with the subscriber specific conditional access code. If they match {316}, a write enable is generated {310}. If not, the fourth set of four bytes is compared {317} with the subscriber specific conditional access code. If they match {318}, a write enable is generated {310}. If not, the last 12 bytes of the header are examined for all zeroes {320}. If all zeroes are detected in the last 12 bytes, a write enable is generated {310} and if not a write enable is not generated and the process waits {300} for the next packet. In an alternative arrangement, at step {320} the system may be programmed to look for all zeroes in all 16 bytes of the header. It should also be appreciated that some other fixed pattern may be utilized other than all zeroes, such as all ones or an alternating pattern of zeroes and ones for example At step {306} if the first four bytes are all zeroes, three of the second four bytes of the header are compared {354} with the subscriber specific conditional access code. In the FIG. 4 apparatus this may be accomplished by arranging the element 255 to look for three matches for exclusive groups of four bytes. If three of the four bytes match {326} a write enable is generated {322} and if not, three of the third set of four header bytes are compared {330} with the subscriber specific conditional access code. If three of the four bytes match {332}, a write enable is generated {322}, and if not, three of the last four bytes are compared {336} with the subscriber specific conditional access code. If they match, a write enable is generated {322} and if not the all zero condition is examined {320}.

Note a further level of detection may be incorporated similar to the steps {324–340} where only two of respective groups of four bytes are matched. This may be conditioned by arranging the first eight bytes to be all zeroes or the first four bytes to be all ones, for example. In this instance the respective groups being enabled by the conditional access codes becomes much larger.

Regarding storing entitlement payloads in the memory 18, the system writes the payload header to memory as it is received and examined for conditional access codes. If a conditional access code is detected, the write enable which is detected simply allows the memory control to continue writing the payload. Conversely if a conditional access code is not detected within the first 16 bytes of the payload, the remainder of the payload is not written to memory, and the memory address for a conditional access payload is reset to overwrite the 16 bytes of payload conditional access header.

Figure 6:
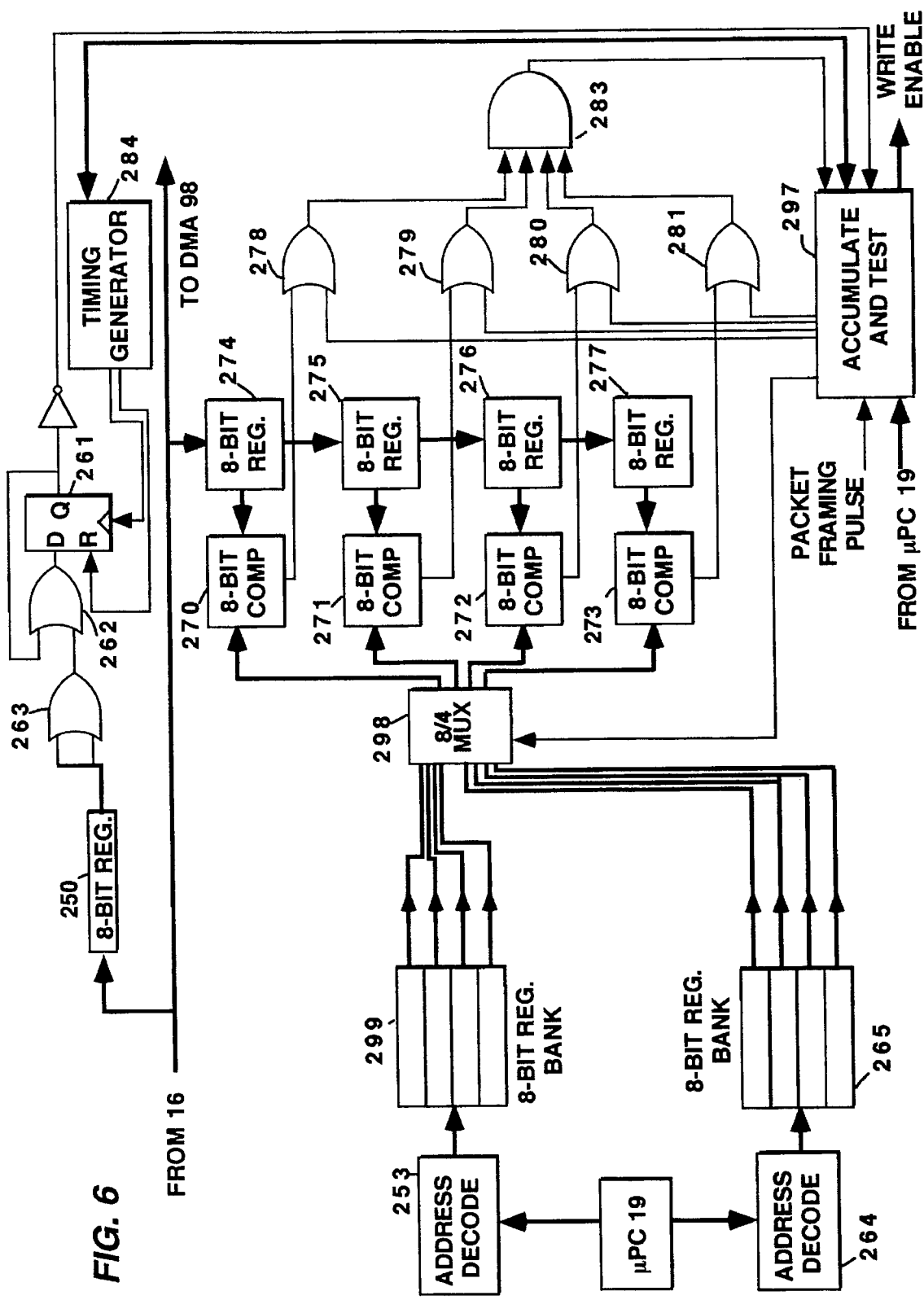
FIG. 6 is a block diagram of an alternative conditional access filter.

FIG. 6 is an alternative conditional access filter which compares as many as 32 bits (four bytes) at a time. This permits detection of start codes without foreknowledge of the byte position of the start code. The start code is stored in 8-bit registers 265. (Eight bit registers are used because an 8-bit μPC bus is employed.) The output ports of the registers are coupled to a first set of inputs of a multiplexer 298. The subscriber specific conditional access code is stored in a second register bank 299, which have respective output ports coupled to a second set of inputs to the multiplexer 298. The multiplexer 298 has a set of outputs connected to respective first 8-bit input ports of comparators 270–273. Whether the output ports of registers 265 or 299 are coupled to the comparators is controlled by the accumulate and test circuitry 297 responsive to the upC.

Input bytes from the decryptor 16 are coupled to the parallel/serial registers 274–277. The respective registers 274–277 have parallel output ports coupled respectively to second 8-bit input ports of the comparators 270–273. The system is timed such that four successive bytes of the input signal are currently loaded into the registers 274–277. The output terminals of the comparators are coupled to the accumulate and test circuit 97 via respective OR gates 278–281. Second input terminals of the OR circuits are coupled to respective control output connections of the accumulate and test circuit 297.

As in the FIG. 4 apparatus, the apparatus of FIG. 6 includes an all zeroes detector 261–263 for detecting all zeroes in the first four bytes and all sixteen bytes.

For four byte conditional access code detection, successive exclusive groups of four bytes are loaded into the registers 274–277 and tested against the subscriber specific conditional access code contained in the registers 299. If all four comparators detect a match, the AND gate 283 produces a logic one indicating a match. If one of the comparators fails to detect a match the AND gate produces a logic zero. For three out of sets of four input byte conditional access code detection, the accumulate and test circuit 297 applies a logic one value to one of the control lines coupled to the OR gates. This forces the output of that OR gate to a logic one, effectively forcing a match from the associated comparator. Conditional access code detection is then performed on successive exclusive groups of four bytes as for four byte detection.

For start code detection, the control lines of all of the OR gates are held at a logic zero. Input bytes are sequentially applied to the cascade connection of registers 274–277 and a test for match with the start code stored in the registers 265 is made on each successive inclusive set of four input bytes.

Figure 7:
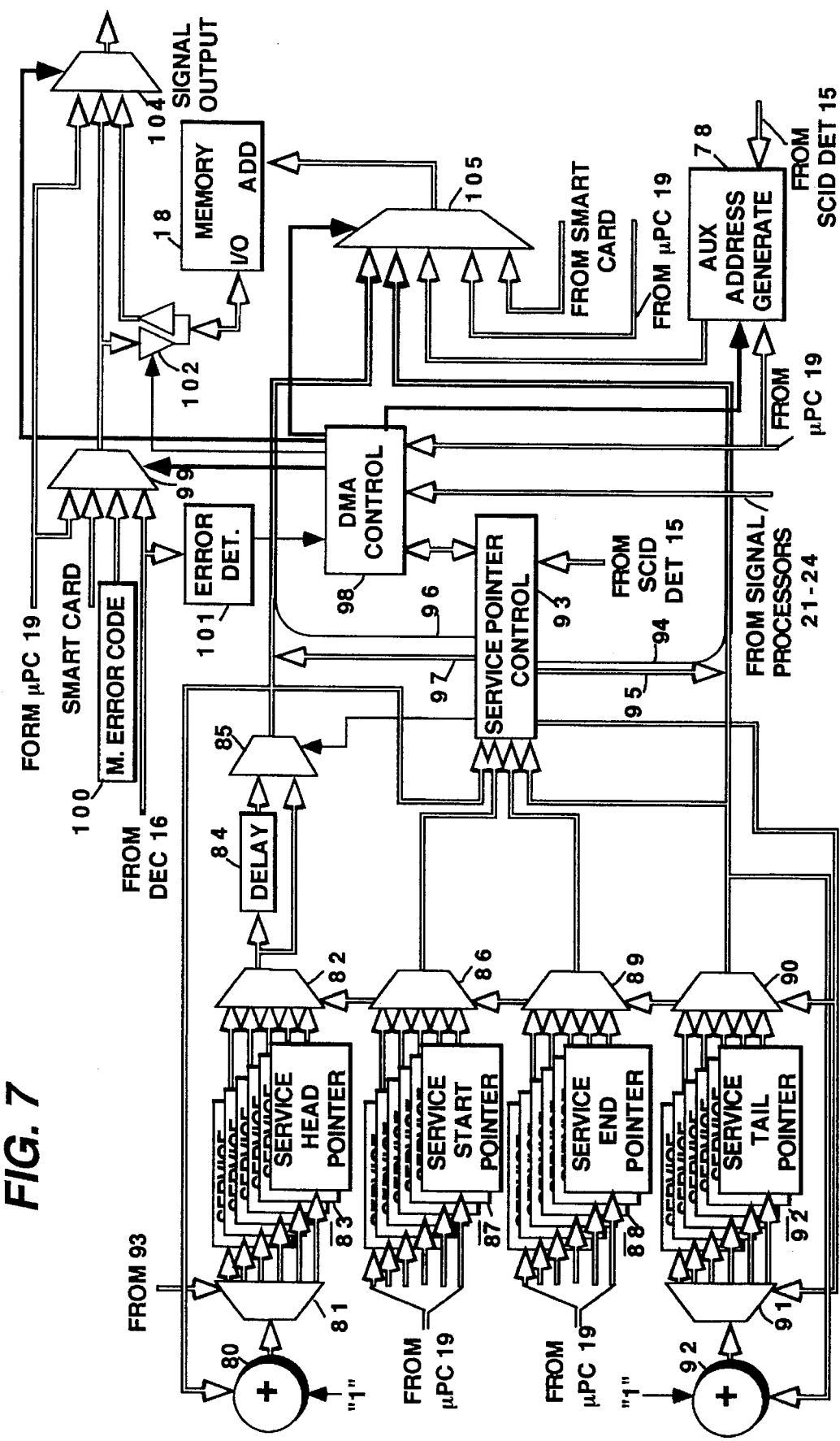
FIG. 7 is a block diagram of exemplary memory management circuitry which may be implemented for element 17 of FIG. 3.

FIG. 7 illustrates exemplary apparatus for the memory controller 17 shown in FIG. 3. Each program component is stored in a different contiguous block of the memory 18. In addition other data, such as data generated by the microprocessor 19 or the Smart Card (not shown) may be stored in the memory 18.

Addresses are applied to the memory 18 by a multiplexer 105, and input data is applied to the memory 18 by a multiplexer 99. Output data from the memory management circuitry is provided to the signal processors by a further multiplexer 104. Output data provided by the multiplexer 104 is derived from the microprocessor 19, the memory 18 or directly from the multiplexor 99. Program data is presumed to be of standard picture resolution and quality, and occurring at a particular data rate. On the other hand high definition television signals, HDTV, which may be provided by this receiver, occur at a significantly higher data rate. Practically all data provided by the FEC will be routed through the memory 18 via the multiplexor 99 and memory I/O circuit 102, except for the higher rate HDTV signals which may be routed directly from the multiplexor 99 to the multiplexor 104. Data is provided to the multiplexer 99 from the decryptor 16, the smart card circuitry, the microprocessor 19, and a source of media error codes 100. The term "media error codes as used herein, means special codewords to be inserted in a data stream, to condition the respective signal processor (decompressor) to suspend processing until detection of a predetermined codeword such as a start code, and then to resume processing in accordance with the e.g. start code.

Memory addresses are provided to the multiplexor 105, from program addressing circuitry 79–97, from the microprocessor 19, from the Smart Card apparatus 31 and from the auxiliary packet address counter 78. Selection of the particular address at any particular time period is controlled by a direct memory access DMA, circuit 98. The SCID control signals from the comparator 15 and "data needed" signals from respective signal processors are applied to the DMA 98, and responsive thereto, memory access contention is arbitrated. The DMA 98 cooperates with a Service Pointer Controller 93, to provide the appropriate read or write addresses for respective program signal components.

The respective addresses for the various signal component memory blocks are generated by four groups of program component or service pointer registers 83, 87, 88, and 92. The starting pointers for respective blocks of memory, into which respective signal components are stored, are contained in registers 87 for the respective signal components. The start pointers may be fixed values, or they may be calculated by conventional memory management methods in the microprocessor 19.

Pointers for the last address of respective blocks are stored in the bank of service registers 88, one for each potential program component. Similar to the start addresses, the end or last addresses may be fixed values or they may be calculated values provided by the microprocessor 19. Using calculated values for starting and end pointers is preferred because it provides a more versatile system with less memory.

The memory write pointers or head pointers are generated by the adder 80 and the service head registers 83. There is a service head register for each potential program component. A write or head pointer value is stored in a register 83, and provided to the address multiplexor 105 during a memory write cycle. The head pointer is also coupled to the adder 80, wherein it is incremented by one unit, and the incremented pointer is stored in the appropriate register 83 for the next write cycle. The registers 83 are selected by the service pointer controller, 93, for the appropriate program component currently being serviced.

In this example it is assumed that the start and end pointers are 16-bit pointers. The registers 83 provides 16 bit write or head pointers. 16-bit pointers were selected to facilitate use of 16-bit or 8-bit busses for loading the start and end pointers in the registers 87 and 88. The memory 18, on the other hand, has 18-bit addresses. The 18-bit write addresses are formed by concatenating the two most significant bits of the start pointers to the 16-bit head pointers, with the start pointer bits in the most significant bit positions of the combined 18-bit write address. The start pointers are provided by the respective registers 87 to the service pointer controller 93. The service pointer controller parses the more significant start pointer bits from the start pointers stored in registers 87, and associates these bits with the 16-bit head pointer bus. This is illustrated by the bus 96 shown being combined with the head pointer bus exiting the multiplexor 85, and by FIG. 8 with reference to the bold arrows.

Figure 8:
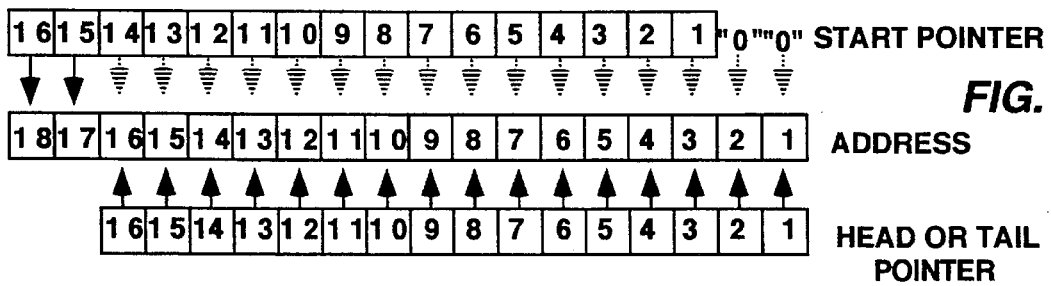
FIG. 8 is a pictorial representation showing memory address formation for service channel data.

In FIG. 8, the top middle and bottom rows of boxes represent the bits of a start pointer, an address and a head or tail pointer respectively. The higher numbered boxes represent more significant bit positions. The arrows indicate from which bit positions of the start or head/tail pointers the respective bits of an address are derived. In this derivation the bold arrows represent steady state operation.

Similarly, memory read pointers or tail pointers are generated by the adder 79 and the service tail registers 92. There is a service tail register for each potential program component. A read or tail pointer value is stored in a register 92, and provided to the address multiplexor 105 during a memory read cycle. The tail pointer is also coupled to the adder 79, wherein it is incremented by one unit, and the incremented pointer is stored in the appropriate register 92 for the next read cycle. The registers 92 are selected by the service pointer controller, 93, for the appropriate program component currently being serviced.

The registers 92 provides 16 bit tail pointers. 18-bit read addresses are formed by concatenating the two most significant bits of the start pointers to the 16-bit tail pointers, with the start pointer bits in the most significant bit positions of the combined 18-bit write address. The service pointer controller parses the more significant start pointer bits from the start pointers stored in registers 87, and associates these bits with the 16-bit tail pointer bus. This is illustrated by the bus 94 shown being combined with the tail pointer bus exiting the multiplexor 90.

Data is stored in the memory 18 at the calculated address. After storing a byte of data, the head pointer is incremented by one and compared to the end pointer for this program component, and if they are equal the more significant bits of the head pointer are replaced with the lower 14 bits of the start pointer and zeros are placed in the lower two bit positions of the head pointer portion of the address. This is illustrated in FIG. 8 with reference to the hatched arrows between the start pointers and the address. This operation is illustrated by the arrow 97 pointing from the service pointer controller 93 to the head pointer bus from the multiplexor 85. It is presumed that application of the lower 14 start pointer bits override the head pointer bits. Replacing the head pointer bits with the lower start pointer bits in the address for this one write cycle, causes the memory to scroll through the memory block designated by the upper two start pointer bits, thus obviating reprogramming write addresses at the start of each packet to a unique memory location within a block.

If the head pointer ever equals the tail pointer (used to indicate where to read data from the memory 18) a signal is sent to the interrupt section of the microprocessor to indicate that a head-tail crash has occurred. Further writing to the memory 18 from this program channel is disabled until the microprocessor re-enables the channel. This case is very rare and should not occur in normal operation.

Data is retrieved from the memory 18 at the request of the respective signal processors, at addresses calculated by the adder 79 and registers 92. After reading a byte of stored data, the tail pointer is incremented by one unit and compared to the end pointer for this logical channel in the service pointer controller 93. If the tall and end pointers are equal then the more significant bits of the tall pointer are replaced with the lower 14 bits of the start pointer and zeros are placed in the lower two bit positions of the tall pointer portion of the address. This is illustrated by the arrow 95 emanating from controller 93 and pointing to the tail pointer bus from the multiplexer 90. If the tail pointer is now equal to the head pointer, then the respective memory block is defined as empty and no more bytes will be sent to the associated signal processor until more data is received from the FEC for this program channel. The actual replacement of the head or tail pointer portions of the respective write or read addresses by the lower 14 bits of the start pointer may be accomplished by appropriate multiplexing, or the use of three state interconnects.

Memory read/write control is performed by the service pointer controller and direct memory access, DMA, elements 93 and 94. The DMA is programmed to schedule read and write cycles. Scheduling is dependent upon whether the FEC 12 is providing data to be written to memory or not. FEC data write operations take precedence so that no incoming signal component data is lost. In the exemplary apparatus illustrated in FIG. 7, there are four types of apparatus which may access the memory. These are Smart Card, the FEC 12 (more precisely the decryptor 16), the microprocessor 19 and the application devices such as the audio and video processors. Memory contention is handled in the following manner. The DMA, responsive to data requests from the various processing elements listed above, allocates blocks of memory for respective program components. Access to the memory is provided in 95 nS time slots during which a byte of data is read from or written to the memory 18. There are two major modes of access allocation, defined by "FEC Providing Data", or "FEC Not Providing Dam" respectively. For each of these modes the time slots are allocated and prioritized as follows, assuming a maximum FEC data rate of 5 Mbytes/second, or one byte for each 200 nS. These are:

FEC Providing Data
1) FEC data write;
2) Application device read/Microprocessor read/write;
3) FEC data write;
4) Microprocessor read/write; and for FEC Not Providing Data
1) Smart Card read/write;
2) Application device read/Microprocessor read/write;
3) Smart Card read/write;

4) Microprocessor read/write.

Because FEC data writes cannot be deferred, the FEC (or more correctly the decryptor), when providing data must be guaranteed memory access during each 200 nS interval. Alternate time slots are shared by the application devices and the microprocessor. When there is no data available for the requesting devices, the microprocessor is provided use of the application time slots.

The Controller 93 communicates with the SCID detector to determine which of the respective Start, head and end pointer registers to access for memory write operations. The controller 93 communicates with the DMA to determine which of the start, end and tail registers to access for memory read operations. The DMA 98 controls selection of the corresponding addresses and data by the multiplexers 99, 104 and 105.

Figure 9:
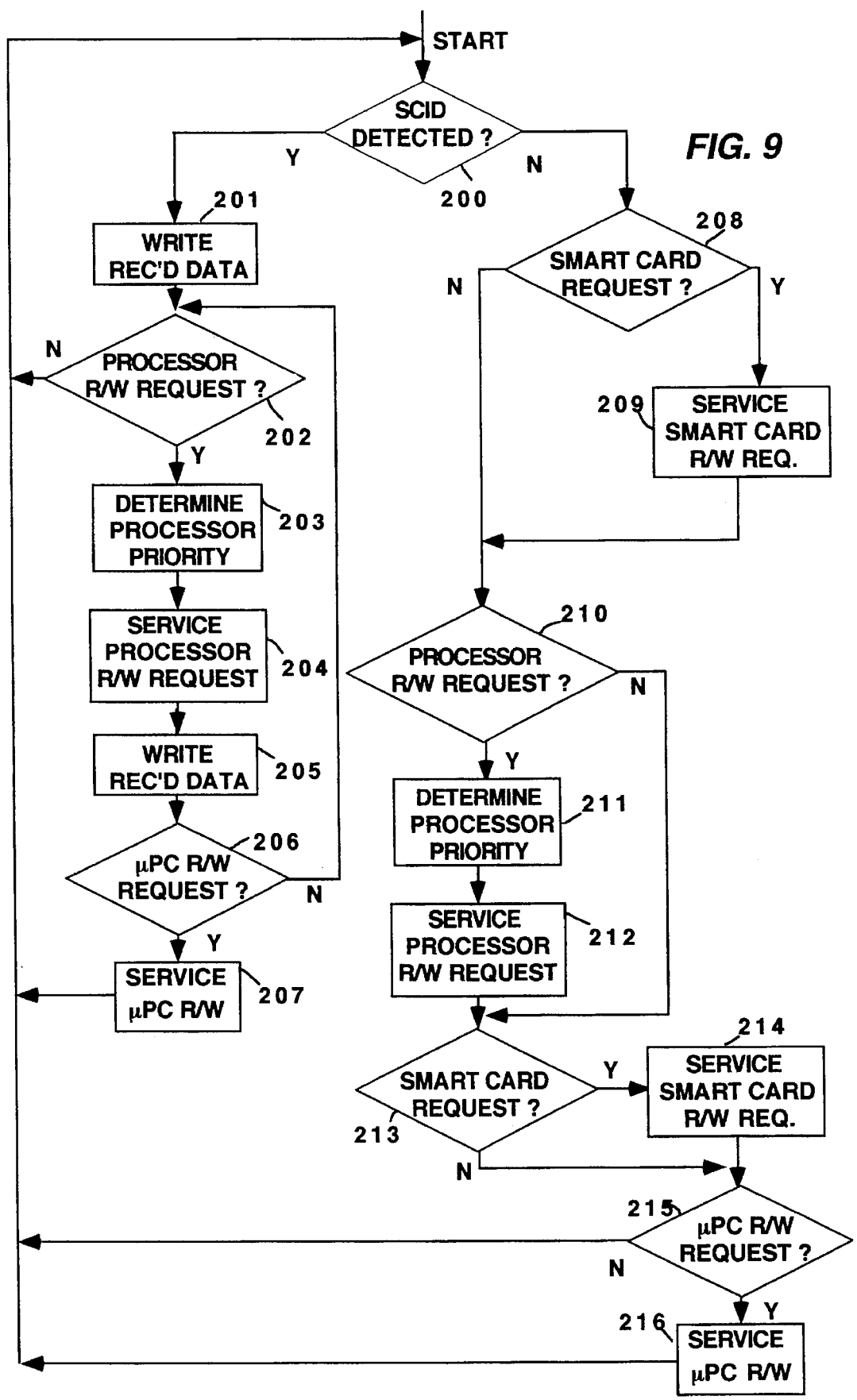
FIG. 9 is a flow chart of operation of the memory address control.

FIG. 9 illustrates an exemplary flow chart of the DMA 98 memory access process. The DMA responds {200} to detection or non detection of a received packet via detection of SCID's. If a SCID has been detected indicating the presence of data from the decryptor 16 to be written to memory, one byte of program data from the decryptor is written {201} to the buffer memory 18. The block of memory to which it is written is determined by the processor 93 responsive to the current SCID. Next the DMA determines {202} if any of the program component processors, including the smart card and μPC are requesting data or read/write (R/W) access to the memory 18. If no data requests are made on the DMA the process returns to step {200}. If a data R/W request has been made, the DMA determines {203} the priority of the request. This will be accomplished by a conventional interrupt routine or alternatively, by sequential one byte service in an arbitrary order of those program processors requesting data. For example, assume that an arbitrary order of access priority is video, audio I, audio II, smart card, and μPC. Assume also that only the video, audio II and μPC are requesting memory access. During the current operation of step {203} a byte of video will be read from memory. During the next operation of step {203} a byte of audio II will be read from memory, and During the next subsequent occurrence of step {203} a byte of μPC data will be written to- or read from memory 18 and so forth. Note that addresses for smart card and μPC access are provided by the smart card and μPC respectively, but addresses for video, audio and program guide are available from the address pointer arrangement (80–93).

Once priority access has been established {203}, the requisite program processor is serviced {204} with one byte of data written to- or read from memory 18. Next a byte of data from the decryptor 16 is written {205} to memory. A check {206} is made to determine if the μPC is requesting access. If the μPC is requesting access, it is serviced {207} with one byte of data. If the μPC is not requesting access the process jumps to step {202} to determine if any of the program processors are requesting access. In this manner the incoming data is always guaranteed access to every other memory access period, and the intervening memory access periods are spread amongst the program processors.

If data is not presently available from the decryptor 16, i.e. an SCID is not currently detected, the process {208–216} is followed. First the smart card is examined {208} to determine if it is requesting memory access. If it is, it is given a one byte memory access {209}, else a check is made {210} to determine if any of the program processors is requesting memory access. If a data R/W request has been made, the DMA determines {211} the priority of the request. The appropriate processor is serviced {212} with a one byte memory read or write access. If a data R/W request has not been made by the program processors, the process jumps to step {213} where a test is performed to determine if the smart card is requesting memory access. If it is it is serviced {216} with a one byte memory access, else the process jumps to step {200}.

It should be recognized that in the present preferred example, when in the "FEC Not Providing Data" mode, the smart card is provided a two-to-one access precedence over all other program processors. This priority is programmed into a programmable state machine within the DMA apparatus and is subject to being changed by the μPC. As mentioned earlier, the system is intended to provide interactive services, and the μPC 19 will be responsible to interactive data to perform at least in part the interactive operation. In this role, the μPC 19 will use the memory 18 both for application storage and working memory. In these instances, the system operator may change the memory access priority to provide the μPC 19 with memory access of greater frequency. The programming of memory access priority may be included as a subset of interactive application instructions.

It is advantageous to insert media error codes into the video component signal stream when packets are lost, to condition the video signal decompressor to suspend decompression until a particular signal entry point occurs in the data stream. It is not practical to predict where and in which video packet the next entry point may occur. In order to find the next entry point as fast as possible, it is necessary to include a media error code at the beginning of the first video packet after detection that a packet is lost. The circuitry of FIG. 7 places a media error code at the beginning of every video packet and then excises the media error code in respective packets if there is no loss of a preceding packet. The media error code is inserted in the first M memory address locations reserved for the current video packet payload, by writing to memory 18 for M write cycles prior to the video payload arriving from the decryptor. Concurrently the multiplexor 99 is conditioned by the DMA 98, to apply the media error code from the source 100 to the memory 18 I/O. M is simply integer number of memory locations required to store the media error code. Assuming the memory to store 8-bit bytes, and the media error code to be 32 bits, M will equal 4.

The addresses for loading the media error code in memory are provided by the respective video component service register 83 via the multiplexer 82 and multiplexer 85. It will be appreciated that the first M addresses provided from the pointer register 83 for loading the media error code into the memory locations that would otherwise be loaded with video component data, will simply be the next M sequential addresses that would normally be produced by the video head pointer. These same addresses are coupled into an M-stage delay element 84, so that immediately after the last byte of the media error code is stored in the memory 18, the first of the M addresses is available at the output of the delay element 84.

The timing of the loading of the media error code into memory coincides with the determination of a lost packet. Packet error or loss detection is performed by an error detector 101 which is responsive to the CC and HD dam of the current packet.

If a packet loss is detected, the video component of the current packet is stored in memory 18, starting at the next or $(M+1)^{th}$ address location. This is accomplished by conditioning the multiplexer 85 to continue to pass undelayed head pointers from the appropriate register 83. Alternatively, if a packet loss is not detected, the first M bytes of the video component in the current packet are stored in the memory locations in which the media error code was immediately previously stored.

Packet error or loss detection is performed by an error detector 101 which is responsive to the CC and HD data of the current packet. The detector 101 examines the continuity count CC in the current packet to determine if it differs from the CC of the previous packet by one unit. In addition the TOGGLE bit in the current packet is examined to determine if it exhibits the proper state for the respective video frame. If the CC value is incorrect, the state of the TOGGLE bit is examined. Depending if one or both of the CC and TOGGLE bit are in error, first or second modes of error remediation are instituted respectively. In the second mode, initiated by both CC and TOGGLE bits being erroneous, the system is conditioned to reset to a packet containing a picture layer header. In the first mode, where only the CC is erroneous, the system is conditioned to reset to a packet containing a slice layer header. (A slice layer is a subset of compressed data within a frame.) In both the first and second modes, the media error code written to memory is retained in the respective payload to alert the decompressor to institute remedial action.

It has been found to be particularly efficient to partition the system such that the SCID detector, the decryptor, the addressing circuitry, the conditional access filter, and the smart card interface are all included on a single integrated circuit. This limits the number of external paths which may lead to critical timing constraints.

What is claimed is:

1. Apparatus in a packet signal receiver for processing a packet signal containing entitlement data included in signal packets having a header identifying such packets as containing entitlement data, and having a payload containing said entitlement data and a payload header including a plurality of adjacently concatenated N-byte conditional access codes, said apparatus comprising:

means for applying said packet signal;

a transport processor, responsive to said packet signal, for identifying signal packets containing entitlement data, and extracting entitlement data payloads from identified packets;

memory means for storing extracted entitlement data payloads; and a conditional access filter arranged to examine payload header data of extracted entitlement data payloads for subscriber specific or subscriber group N-byte conditional access codes, including a comparator, for comparing, said payload header data including said plurality of adjacently concatenated N-byte conditional access codes, in exclusive N-byte groups, with an N-byte conditional access code stored in said receiver, and if a match is made of said N-byte conditional access code with any of said exclusive N-byte groups, generating an enable signal to write said entitlement data to said memory means.

2. The apparatus set forth in claim 1 further including a smart card coupled to said memory means for utilizing entitlement data stored in said memory means from respective said payloads having entitlement data.

3. Apparatus in a packet signal receiver for processing a packet signal containing entitlement data included in signal packets having a header identifying such packets as containing entitlement data, and having a payload containing said entitlement data and a payload header including a conditional access code, said apparatus comprising:

means for applying said packet signal;

a transport processor, responsive to said packet signal, for identifying signal packets containing entitlement data, and extracting payloads from identified packets;

memory means for storing extracted payloads;

a conditional access filter arranged to examine payload header data of extracted payloads for subscriber specific conditional access codes, and on failure of detection of a subscriber specific payload inhibiting storing of extracted payloads in said memory means;

a register for storing a N-byte subscriber specific conditional access code; and means, including a comparator for,
  a) determining if the first N-bytes of said payload header data contain a code of all one logic state;
  b) if said first N-bytes do contain a code of all one logic state, comparing N−1 bytes of said subscriber specific conditional access code with said payload header data in exclusive N-byte groups, and if a match is made of N−1 bytes of said subscriber specific conditional access code with N−1 bytes of any of said exclusive N-byte groups, generating an enable signal to write said entitlement data to said memory means;
  c) else comparing said payload header data in exclusive N-byte groups, with said N-byte subscriber specific conditional access code contained in said register, and if a match is made of said subscriber specific conditional access code with any of said exclusive N-byte groups, generating an enable signal to write said entitlement data to said memory means.

4. The apparatus set forth in claim 3 further including a detector for detecting if a predetermined number of N-byte groups of said conditional access code in said payload header data are of like logic state, and if so, generating said enable signal.

5. The apparatus set forth in claim 3 further including a detector for detecting if a predetermined number of N-byte groups of said conditional access code in said payload header data have all zero valued bits, and if so, generating said enable signal.

6. Apparatus in a packet signal receiver for processing a packet signal, each packet of said packet signal having a first segment containing data fields common to all packets and a second segment containing a payload, respective payloads containing compressed audio signal, or compressed video signal or digital data, and ones of payloads containing digital data including entitlement data with a conditional access code, said apparatus comprising:

means for applying said packet signal;

a transport processor, responsive to said common fields of first segments of respective packets for selecting packets, which have payloads including entitlement data, and extracting payloads of selected packets;

memory means for storing extracted payloads;

a conditional access filter arranged to examine payloads of digital data of selected said packets for subscriber specific conditional access codes, and on failure of detection of a subscriber specific payload inhibiting storing of extracted payloads in said memory means; and a detector for detecting if all bytes of said conditional access code in said payload header data are of like logic state, and if all bytes of said conditional access code in said payload header data are of like logic state, generating an enable signal to write payload entitlement data to said memory means.

7. Apparatus in a packet signal receiver for processing a packet signal containing entitlement data included in signal packets having a header identifying such packets as containing entitlement data, and having a payload containing said entitlement data and a payload header including a conditional access code, said apparatus comprising:

means for applying said packet signal;

a transport processor, responsive to said packet signal, for identifying signal packets containing entitlement data, and extracting payloads from identified packets;

memory means for storing extracted payloads;

a conditional access filter arranged to examine payload header data of extracted payloads for subscriber specific conditional access codes, and on failure of detection of a subscriber specific payload inhibiting storing of extracted payloads in said memory means;

a register for storing a N-byte subscriber specific conditional access code;

means, including a comparator, for comparing said payload header data in exclusive N-byte groups, with said N-byte subscriber specific conditional access code contained in said register, and if a match is made of said subscriber specific conditional access code with any of said exclusive N-byte groups, generating an enable signal to write said entitlement data to said memory means, wherein said register for storing a N-byte subscriber specific conditional access code comprises N 1-byte registers, and said conditional access filter further comprises:

a multiplexer having N input ports respectively coupled to said N 1-byte registers; and counting circuitry for conditioning said multiplexer to scan its input ports to sequentially provide data from said N 1-byte registers, to said comparison means.

8. Apparatus in a packet signal receiver for processing a packet signal containing entitlement data included in signal packets having a header identifying such packets as containing entitlement data, and having a payload containing said entitlement data and a payload header including a conditional access code, said apparatus comprising:

means for applying said packet signal;

a transport processor, responsive to said packet signal, for identifying signal packets containing entitlement data, or MPEG video signal data, and extracting payloads from identified packets;

memory means for storing extracted payloads;

a dual function conditional access filter arranged in a first mode to examine payload header data of extracted entitlement data payloads for conditional access codes, and on failure of detection of a payload inhibiting storing of extracted payloads in said memory means, and arranged in a second mode for detecting MPEG video component start codes in payloads containing MPEG video signal data.

9. Apparatus in a packet signal receiver for processing a packet signal containing entitlement data included in signal packets having a header identifying such packets as containing entitlement data, and having a payload containing said entitlement data and a payload header including a conditional access code, said apparatus comprising:

means for applying said packet signal;

a transport processor, responsive to said packet signal, for identifying signal packets containing entitlement data, and extracting payloads from identified packets;

memory means for storing extracted payloads; and a conditional access filter for detecting conditional access codes in a first mode and detecting video component start codes in a second mode, wherein said conditional access filter comprises:

a register for storing a N-byte subscriber specific conditional access code;

a register for storing a N-byte video component start code;

a multiplexer, responsive to a control signal for selecting one of said subscriber specific conditional access code or said video component start code; and means, including a comparator, coupled to said multiplexer, for comparing said payload header data in N-byte groups, with said N-byte subscriber specific conditional access code or said video component start code selected by said multiplexer, and if a match is made of said subscriber specific conditional access code with an N-byte group of the payload header, generating an enable signal to write said entitlement data to said memory means, or if a match is made of said video component start code with an N-byte group of the payload header, generating an start code indicating signal.

10. The apparatus set forth in claim 9 wherein said means, including a comparator is arranged to functionally perform, in said first mode;

a) determining if the first N-bytes of said payload header data contain a code of all one logic state;

b) if said first N-bytes do contain a code of all one logic state, comparing N−1 bytes of said subscriber specific conditional access code with said payload header data in exclusive N-byte groups, and if a match is made of N−1 bytes of said subscriber specific conditional access code with N−1 bytes of any of said exclusive N-byte groups, generating an enable signal to write said entitlement data to said memory means;

c) else comparing said payload header data in exclusive N-byte groups, with said N-byte subscriber specific conditional access code contained in said register, and if a match is made of said subscriber specific conditional access code with any of said exclusive N-byte groups, generating an enable signal to write said entitlement data to said memory means.

11. The apparatus set forth in claim 1 wherein said subscriber group conditional access code is for a group selected from groups including (a) subscribers in the same ZIP code (b) subscribers in the same area code and (c) subscribers in the same geographical area.

12. The apparatus set forth in claim 1 wherein said conditional access codes are stored within a smart card.

* * * * *

UNITED STATES PATENT AND TRADEMARK OFFICE
CERTIFICATE OF CORRECTION

PATENT NO.   : 5,619,501
DATED        : April 8, 1997
INVENTOR(S)  : Gregory G. Tamer, Michael S. Deiss, John W. Chaney and James E. Hailey It is certified that error appears in the above-identified patent and that said Letters Patent is hereby corrected as shown below:

Delete claim 8, claim 9 and claim 10 beginning at column 16, line 37 and ending at column 18, line 17 as such;

[8. Apparatus in a packet signal receiver for processing a packet signal containing entitlement data included in signal packets having a header identifying such packets as containing entitlement data, and having a payload containing said entitlement data and a payload header including a conditional access code, said apparatus comprising:

means for applying said packet signal;

a transport processor, responsive to said packet signal, for identifying signal packets containing entitlement data, or MPEG video signal data, and extracting payloads from identified packets;

memory means for storing extracted payloads;

a dual function conditional access filter arranged in a first mode to examine payload header data of extracted entitlement data payloads for conditional access codes, and on failure of detection of a payload inhibiting storing of extracted payloads in said memory means, and arranged in a second mode for detecting MPEG video component start codes in payloads containing MPEG video signal data.

9. Apparatus in a packet signal receiver for processing a packet signal containing entitlement data included in signal packets having a header identifying such packets as containing entitlement data, and having a payload containing said entitlement data and a payload header including a conditional access code, said apparatus comprising:

means for applying said packet signal;

a transport processor, responsive to said packet signal, for identifying signal packets containing entitlement data, and extracting payloads form identified packets;

UNITED STATES PATENT AND TRADEMARK OFFICE
CERTIFICATE OF CORRECTION

PATENT NO. : 5,619,501
DATED : April 8, 1997
INVENTOR(S) : Gregory G. Tamer, Michael S. Deiss, John W. Chaney and James E. Hailey It is certified that error appears in the above-identified patent and that said Letters Patent is hereby corrected as shown below:

memory means for storing extracted payloads; and
a conditional access filter for detecting conditional access codes in a first mode and detecting video component start codes in a second mode, wherein said conditional access filter comprises:
a register for storing a N-byte subscriber specific conditional access code;
a register for storing a N-byte video component start code;
a multiplexer, responsive to a control signal for selecting one of said subscriber specific conditional access code or said video component start code; and
means, including a comparator, coupled to said multiplexer, for comparing said payload header data in N-byte groups, with said N-byte subscriber specific conditional access code or said video component start code selected by said multiplexer, and if a match is made of said subscriber specific conditional access code with an N-byte group of the payload header, generating an enable signal to write said entitlement data to said memory means, or if a match is made of said video component start code with an N-byte group of the payload header, generating an start code indicating signal.

10. The apparatus set forth in claim 9 wherein said means, including a comparator is arranged to functionally perform, in said forst mode;
a) determining if the first N-bytes of said payload header data contain a code of all one logic state;
b) if said first N-bytes do contain a code of all one logic state, comparing N–1 bytes of said subscriber specific conditional access code with said payload header data in exclusive N-byte groups, and if a match is made of N–1 bytes of said subscriber specific conditional access code with N–1 bytes of any of said exclusive N-byte groups, generating an enable signal to write said entitlement data to said memory means;

UNITED STATES PATENT AND TRADEMARK OFFICE
CERTIFICATE OF CORRECTION

PATENT NO. : 5,619,501
DATED : April 8, 1997
INVENTOR(S) : Gregory G. Tamer, Michael S. Deiss, John W. Chaney and James E. Hailey It is certified that error appears in the above-identified patent and that said Letters Patent is hereby corrected as shown below:

c) else comparing said payload header data in exclusive N-byte groups, with said N-byte subscriber specific conditional access code contained in said register, and if a match is made of said subscriber specific conditional access code with any of said exclusive N-byte groups, generating an enable signal to write said entitlement data to said memory means. ]

Signed and Sealed this

Twenty-seventh Day of November, 2001

Attest:

*Attesting Officer*

NICHOLAS P. GODICI
*Acting Director of the United States Patent and Trademark Office*